United States Patent
Dybsetter et al.

(10) Patent No.: US 8,090,265 B2
(45) Date of Patent: Jan. 3, 2012

(54) BYTE-CONFIGURABLE MEMORY IN AN OPTICAL TRANSCEIVER

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 1467 days.

(21) Appl. No.: 11/074,109

(22) Filed: Mar. 7, 2005

(65) Prior Publication Data

US 2005/0238359 A1      Oct. 27, 2005

Related U.S. Application Data

(60) Provisional application No. 60/550,544, filed on Mar. 5, 2004.

(51) Int. Cl.
   *H04B 10/00*   (2006.01)
(52) U.S. Cl. ........ 398/135; 398/137; 398/138; 398/115; 398/107
(58) Field of Classification Search .................. 398/135, 398/138, 137, 115, 107, 164, 33; 707/205; 709/238; 711/170, 117, 122, 129, 119, 173
   See application file for complete search history.

(56) References Cited

U.S. PATENT DOCUMENTS

| | | | |
|---|---|---|---|
| 5,524,243 A * | 6/1996 | Gheorghiu | 713/1 |
| 5,822,749 A | 10/1998 | Agarwal | |
| 5,892,922 A * | 4/1999 | Lorenz | 709/238 |
| 5,912,897 A * | 6/1999 | Steinbach | 370/467 |
| 5,956,168 A * | 9/1999 | Levinson et al. | 398/41 |
| 5,978,952 A | 11/1999 | Hayek et al. | |
| 6,012,109 A * | 1/2000 | Schultz | 710/56 |
| 6,032,160 A * | 2/2000 | Lehman | 707/205 |
| 6,076,183 A | 6/2000 | Espie et al. | |
| 6,259,702 B1 * | 7/2001 | Yamamoto | 370/437 |
| 6,378,023 B1 * | 4/2002 | Christie et al. | 710/260 |
| 6,446,145 B1 | 9/2002 | Har et al. | |
| 6,535,743 B1 * | 3/2003 | Kennedy et al. | 455/456.1 |
| 6,643,818 B1 | 11/2003 | Valk | |
| 6,658,437 B1 * | 12/2003 | Lehman | 707/205 |
| 6,775,781 B1 | 8/2004 | Phillips et al. | |

(Continued)

FOREIGN PATENT DOCUMENTS

WO    WO 2005/088462      9/2005

OTHER PUBLICATIONS

U.S. Appl. No. 11/073, 886, filed Mar. 7, 2005 entitled "Consistency Checking Over Internal Information in an Optical Transceiver".

(Continued)

*Primary Examiner* — Kenneth N Vanderpuye
*Assistant Examiner* — Hibret Woldekidan
(74) *Attorney, Agent, or Firm* — Maschoff Gilmore & Israelsen

(57) ABSTRACT

A mechanism that enables an optical transceiver to configure memory on a per-segment basis. The optical transceiver includes a processing entity, system memory and a memory configuration table. The memory configuration table is comprised of configuration entries, each of which defines the configuration setting for a corresponding segment of memory. The processing entity reads the configuration entries for a particular segment of the memory. The processing entity then determines the set of one or more configuration settings for the memory segment based on the configuration entry read. This process may be repeated for multiple segments of memory.

20 Claims, 5 Drawing Sheets

U.S. PATENT DOCUMENTS

| | | | |
|---|---|---|---|
| 6,826,658 B1 * | 11/2004 | Gaither et al. | 711/150 |
| 6,925,546 B2 * | 8/2005 | Krejsa | 711/173 |
| 6,981,125 B2 * | 12/2005 | Emmes | 711/207 |
| 6,983,355 B2 * | 1/2006 | Ripberger et al. | 711/206 |
| 7,158,477 B2 * | 1/2007 | Fatica et al. | 370/216 |
| 7,215,891 B1 * | 5/2007 | Chiang et al. | 398/137 |
| 7,233,998 B2 | 6/2007 | Suzuoki et al. | |
| 7,289,045 B1 * | 10/2007 | Walls et al. | 341/50 |
| 7,296,127 B2 | 11/2007 | Safranek et al. | |
| 7,441,061 B2 * | 10/2008 | Gilligan | 710/300 |
| 7,570,887 B2 | 8/2009 | Rohrer et al. | |
| 7,801,449 B2 * | 9/2010 | Hahin et al. | 398/135 |
| 2002/0016942 A1 | 2/2002 | MacLaren et al. | |
| 2002/0080798 A1 * | 6/2002 | Hariguchi et al. | 370/395.31 |
| 2003/0097608 A1 * | 5/2003 | Rodeheffer et al. | 714/7 |
| 2003/0177319 A1 * | 9/2003 | de Jong | 711/154 |
| 2003/0208658 A1 * | 11/2003 | Magoshi | 711/122 |
| 2003/0229765 A1 | 12/2003 | Suzuoki et al. | |
| 2004/0022537 A1 | 2/2004 | Mecherle et al. | |
| 2004/0081424 A1 * | 4/2004 | Moriwaki et al. | 385/147 |
| 2004/0126111 A1 * | 7/2004 | Cho et al. | 398/33 |
| 2004/0132956 A1 * | 7/2004 | Hamao et al. | 528/112 |
| 2004/0136719 A1 * | 7/2004 | Hidai et al. | 398/135 |
| 2004/0136722 A1 * | 7/2004 | Mahowald et al. | 398/138 |
| 2004/0162079 A1 * | 8/2004 | Koshino et al. | 455/445 |
| 2004/0162956 A1 | 8/2004 | Hidai et al. | |
| 2004/0202476 A1 * | 10/2004 | Woolf et al. | 398/135 |
| 2005/0196165 A1 * | 9/2005 | Dybsetter et al. | 398/22 |
| 2006/0007905 A1 | 1/2006 | Yach et al. | |
| 2006/0034612 A1 * | 2/2006 | Yu et al. | 398/135 |
| 2006/0147216 A1 | 7/2006 | Dybsetter | |
| 2006/0193631 A1 * | 8/2006 | Gilligan | 398/58 |
| 2006/0198635 A1 * | 9/2006 | Emery et al. | 398/38 |
| 2007/0002773 A1 | 1/2007 | Wang | |
| 2007/0079185 A1 | 4/2007 | Totolos | |

OTHER PUBLICATIONS

U.S. Appl. No. 11/073,827, filed Mar. 7, 2005 entitled "Multi-Level Memory Access in an Optical Transceiver.".
U.S. Appl. No. 11/073,886, filed Sep. 20, 2007, Office Action.
U.S. Appl. No. 11/073,886, filed Apr. 8, 2008, Office Action.
U.S. Appl. No. 11/073,886, filed Nov. 20, 2008, Office Action.
U.S. Appl. No. 11/073,827, filed Nov. 9, 2007, Office Action.
U.S. Appl. No. 11/073,827, filed Jun. 26, 2008, Office Action.
U.S. Appl. No. 11/073,827, filed Oct. 29, 2008, Office Action.
U.S. Appl. No. 11/073,827, filed Jun. 26, 2009, Office Action.
U.S. Appl. No. 11/073,827, filed Dec. 21, 2009, Office Action.
U.S. Appl. No. 11/073,827, filed Jul. 6, 2010, Office Action.
U.S. Appl. No. 11/073,827, filed Feb. 2, 2011, Office Action.

* cited by examiner

Configuration Entry
Definition *300*

| E₇ | M₆ | M₅ | D₄ | R₃ | R₂ | W₁ | W₀ | Configuration Settings *310* | Abbreviation *320* |
|---|---|---|---|---|---|---|---|---|---|
| 1 | 0 | 0 | x | x | x | x | x | Non volatile Memory | MN |
| 1 | 0 | 1 | x | x | x | x | x | Volatile Memory | MV |
| 1 | 1 | 0 | x | x | x | x | x | Processor Attention 0 (volatile mem) | MA0 |
| 1 | 1 | 1 | x | x | x | x | x | Processor Attention 1 (volatile mem) | MA1 |
| 1 | x | x | 0 | x | x | x | x | Device ID 0 | D0 |
| 1 | x | x | 1 | x | x | x | x | Device ID 1 | D1 |
| 1 | x | x | x | 0 | 0 | x | x | Read by All (not protected) | RA |
| 1 | x | x | x | 0 | 1 | x | x | Read by Password 1 or 2 or 3 | R1 |
| 1 | x | x | x | 1 | 0 | x | x | Read by Password 2 or 3 | R2 |
| 1 | x | x | x | 1 | 1 | x | x | Read by Password 3 | R3 |
| 1 | x | x | x | x | x | 0 | 0 | Write by All (not protected) | WA |
| 1 | x | x | x | x | x | 0 | 1 | Write by Password 1 or 2 or 3 | W1 |
| 1 | x | x | x | x | x | 1 | 0 | Write by Password 2 or 3 | W2 |
| 1 | x | x | x | x | x | 1 | 1 | Write by Password 3 | W3 |

*Fig. 3*

Lowest-Level Table 505

| MA0 | D0 | R3 | WA |
|-----|----|----|----|
| MA1 | D0 | RA | W1 |
| -   | -  | -  | -  |
| -   | -  | -  | -  |

Lower-Level Table 506

| MN | D1 | RA | W3 |
|----|----|----|----|
| MN | D1 | RA | W3 |
| MN | D1 | RA | W3 |
| T 507 ||||

Lowest-Level Table 507

| MN | D1 | RA | W1 |
|----|----|----|----|
| MN | D1 | RA | W1 |
| MN | D1 | RA | W1 |
| MN | D1 | RA | W1 |

*Fig. 5B*

BYTE-CONFIGURABLE MEMORY IN AN OPTICAL TRANSCEIVER

CROSS-REFERENCE TO RELATED APPLICATIONS

This application claims the benefit of U.S. Provisional Application No. 60/550,544, filed Mar. 5, 2004, which is incorporated herein by reference in its entirety.

BACKGROUND OF THE INVENTION

1. The Field of the Invention

The present invention relates generally to memory configuration. More specifically, the present invention relates to memory in optical transceivers that may be configured on a per-segment basis.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier. For example, the controller may control laser calibration, transmission characteristics, debugging, laser bias current and the like.

Therefore, what would be advantageous is to improve the efficiency of such a controller when operating to control the various features of the optical transceiver.

BRIEF SUMMARY OF THE INVENTION

The forgoing problems with the prior state of the art are overcome by the principles of the present invention, which relate to configuring memory in an optical transceiver on a per-segment basis. The optical transceiver includes at least one processing entity, which may be a processor, state machine, or other processing device, a system memory and a memory configuration table.

The memory configuration table contains multiple configuration entries. Each configuration entry defines at least one configuration setting for a segment of the system memory. Examples of configuration settings are readable memory, writeable memory, non-volatile memory, volatile memory, and processor interrupt.

During configuration of the memory, the processor at least indirectly reads a configuration entry for a first segment of the system memory. The configuration entry, as mentioned, defines the configuration settings of the memory segment. The optical transceiver is then able to determine configuration settings for the memory segment based on the configuration settings read. For example, the processor may read in the memory configuration table configuration settings for producing a processor interrupt. The processor, or another optical transceiver, then configures the memory segment to produce a processor interrupt.

In like manner, the processor at least indirectly reads a second configuration entry for a second segment of the system memory. The optical transceiver is then able to determine configuration settings for the second memory segment based on the configuration settings. The processor, or another optical transceiver component, then configures the second memory segment, and so forth for other memory segments if desired.

Advantageously, the optical transceiver is able to have its memory configured on a per-segment basis. This removes the need to have large portions of the memory dedicated to a single use. The small amount of memory may be utilized in an efficient manner by the optical transceiver. This is particularly advantageous if memory is limited.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 illustrates configuration entry definitions that may be used to define configuration for various memory segments;

DETAILED DESCRIPTION OF THE PREFERRED EMBODIMENTS

The principles of the present invention relate to a mechanism that enables an optical transceiver to configure system memory on a per-segment basis. The optical transceiver includes a processing entity, system memory and a memory configuration table. The memory configuration table is comprised of configuration entries, each of which defines the configuration setting for a corresponding segment of memory. The processing entity reads the configuration entry for a particular segment of the memory. The processing entity then determines the set of one or more configuration settings for the memory segment based on the configuration entry read. The process may be repeated for multiple segments of memory. An example operational optical transceiver environment will first be described. Then, the operation in accordance with the invention will be described with respect to the operational environment.

Figure 1:
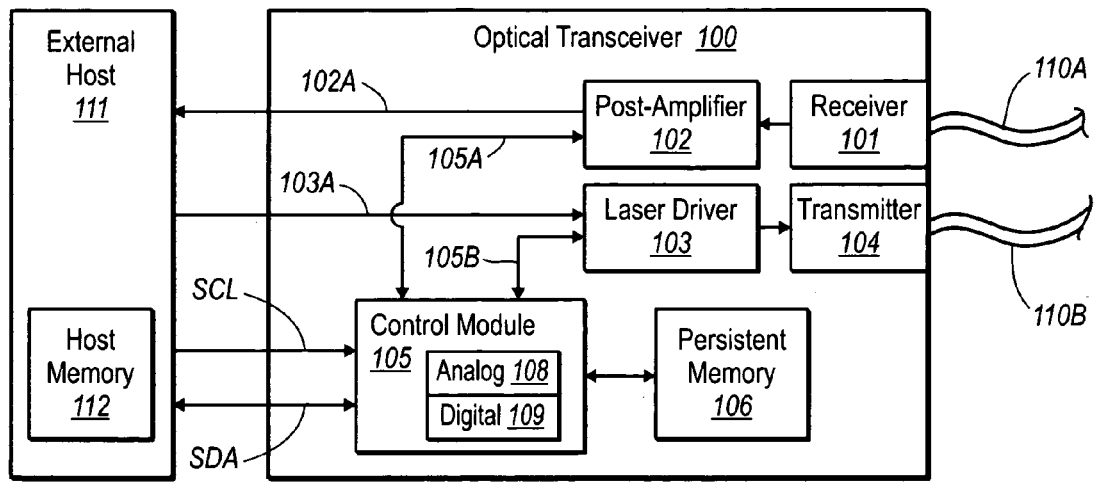
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
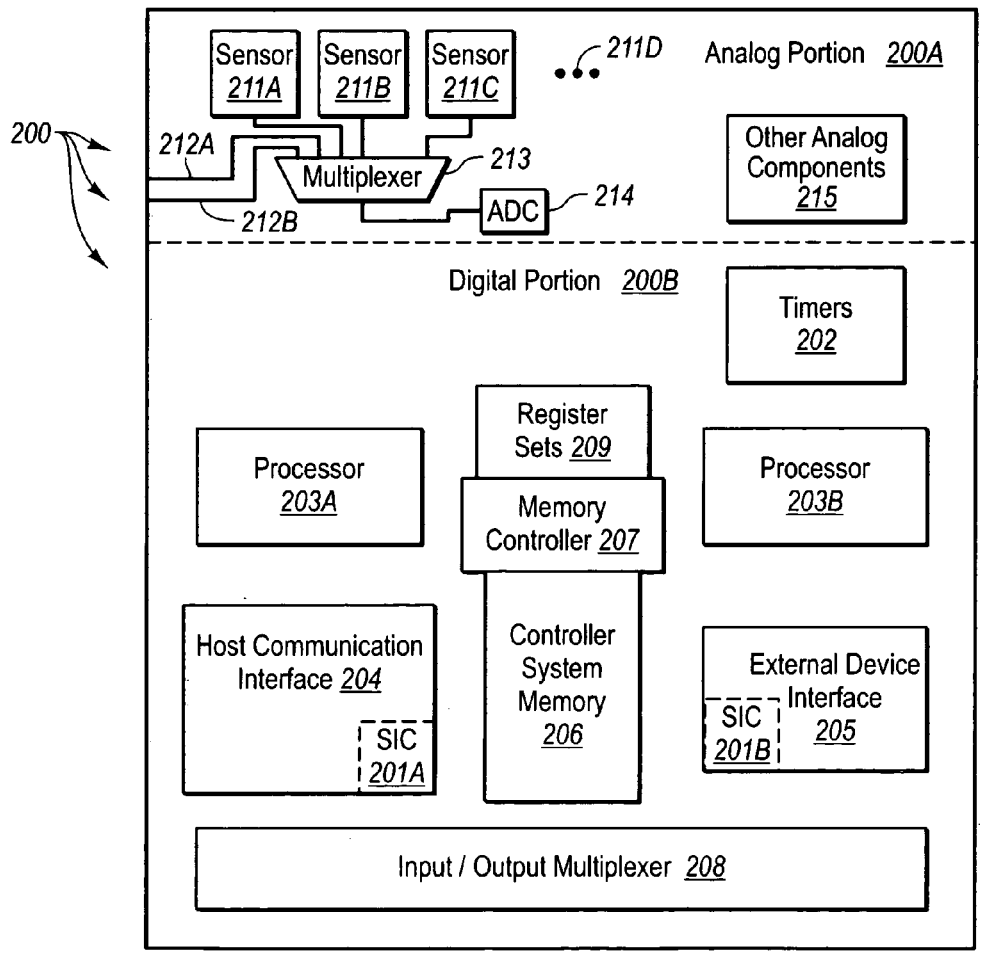
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components. The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or may be another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Register sets 209 contain a number of individual registers. These registers may be used by the processors 203 to write microcode generated data that controls high speed comparison in optical transceiver 100. Alternatively, the registers may hold data selecting operational parameters for comparison. Additionally, the registers may be memory mapped to the various components of optical transceiver 100 for controlling aspects of the component such as laser bias current or transmit power.

Having described a specific environment with respect to FIGS. 1 and 2, it will be understood that this specific environment is only one of countless architectures in which the principles of the present invention may be employed. As previously stated, the principles of the present invention are not intended to be limited to any particular environment and will be described with reference to the environment described in relation to FIGS. 1 and 2.

Accordingly, the principles of the present invention relate to a method that enables an optical transceiver to configure system memory on a per-segment basis. While the system memory may be controller system memory 206 and may be RAM as previously described, it may also be a processor, a register, a flip-flop, non-volatile memory (such as persistent memory 106), or any other memory device.

The system memory or another memory location such as a register in register sets 209 may contain a memory configuration table that is used by optical transceiver 100 to configure individual segments of the system memory. Advantageously, the use of a memory configuration table gives optical transceiver 100 the ability to configure large portions of the system memory (potentially the entire system memory) while only utilizing a very small portion of the memory for the configuration process. In addition, the memory configuration table allows the flexibility to configure different size memory segments for different purposes. The table removes the need to configure large portions of memory as single use segments. The memory configuration table may be single table or it may consist of multiple tables.

The memory configuration table contains memory configuration entries that define the address and configuration settings for a given segment of memory. Examples of configuration settings are readable memory, writeable memory, non-volatile memory, volatile memory, and processor interrupt.

Referring to FIG. 3, an example definition 300 for how the configuration entry may be structured to define various configuration settings is shown. This example definition 300 is by way of illustration only, and it is contemplated that there are numerous additional ways to implement a memory configuration entry on a memory configuration table.

Memory configuration definition 300 is shown as a one byte (eight-bit) entry, although this is not required. Memory configuration entry portion 300 is comprised of various configuration setting possibilities 310. The configuration settings 310 correspond to the various ways that a memory segment may be configured. An abbreviation table 320 is also shown that defines abbreviations for the configuration settings 310 that will be used in subsequent figures.

In accordance with the specific definition of FIG. 3, the seventh ($M_6$) and sixth ($M_5$) bits of memory configuration entry 300 are used to configure memory type for a given segment of memory. For example, the seventh bit $M_6$ defines whether processor attention is required (using, for example, a processor interrupt) when interfacing with that memory segment. A binary zero for bit $M_6$ indicates that no processor interrupt is used. In that case ($M_6$ being zero), bit $M_5$ identifies the type of memory, with a binary zero for $M_5$ indicating that the memory is to be treated as non-volatile memory, and with a binary one for $M_5$ indicating that the memory is to be treated as volatile memory. A binary one for bit $M_6$ indicates that a processor interrupt is used. In that case ($M_6$ being one), bit $M_5$ determines various processor attention states or interrupts that are used to provide different levels of priority for providing an interrupt to a processor.

The fourth ($R_3$) and third ($R_2$) bits are used to configure different levels of access permission needed to read the memory segment. For instance, if $R_3$ is zero and $R_2$ is zero, no password is needed to read the memory segment. If $R_3$ is zero and $R_2$ is one, read permission may be obtained using any one of three passwords (referred to herein as "password 1", "password 2" and "password 3"). If $R_3$ is one and $R_2$ is zero, read permission may be obtained by using two of the higher level passwords (e.g., password 2 or 3). If $R_3$ is one and $R_2$ is one, read permission may be obtained by using only the highest level password (e.g., password 3). Accordingly, the memory segments may be configured by implementing a four level password scheme for allowing a host computing system access to the readable segment of memory.

In like manner, the second ($W_1$) and first ($W_0$) bits are used to configure a segment of memory as writeable using the same four level password scheme. The same principles as discussed for the read bits apply to the write bits (i.e., there are two bits with four different combinations of binary ones and zeros possible). It is possible to independently configure a memory segment to be both readable and writeable for different password levels.

FIG. 3 also shows an eighth bit (E7) and a fifth bit (D4). Bit E7 may be used by embodiments that implement multiple memory configuration tables to identify the memory configuration table. In some embodiments, one portion of system memory is utilized by one device, and a second portion of system memory is utilized by a second device. Bit D4 identifies which of the two devices the memory location corresponds to. The two devices may be different I2C devices controlled by different host interfaces. For example, D0 may correspond to the first I2C device and D1 may correspond to the second I2C device.

Figure 4:
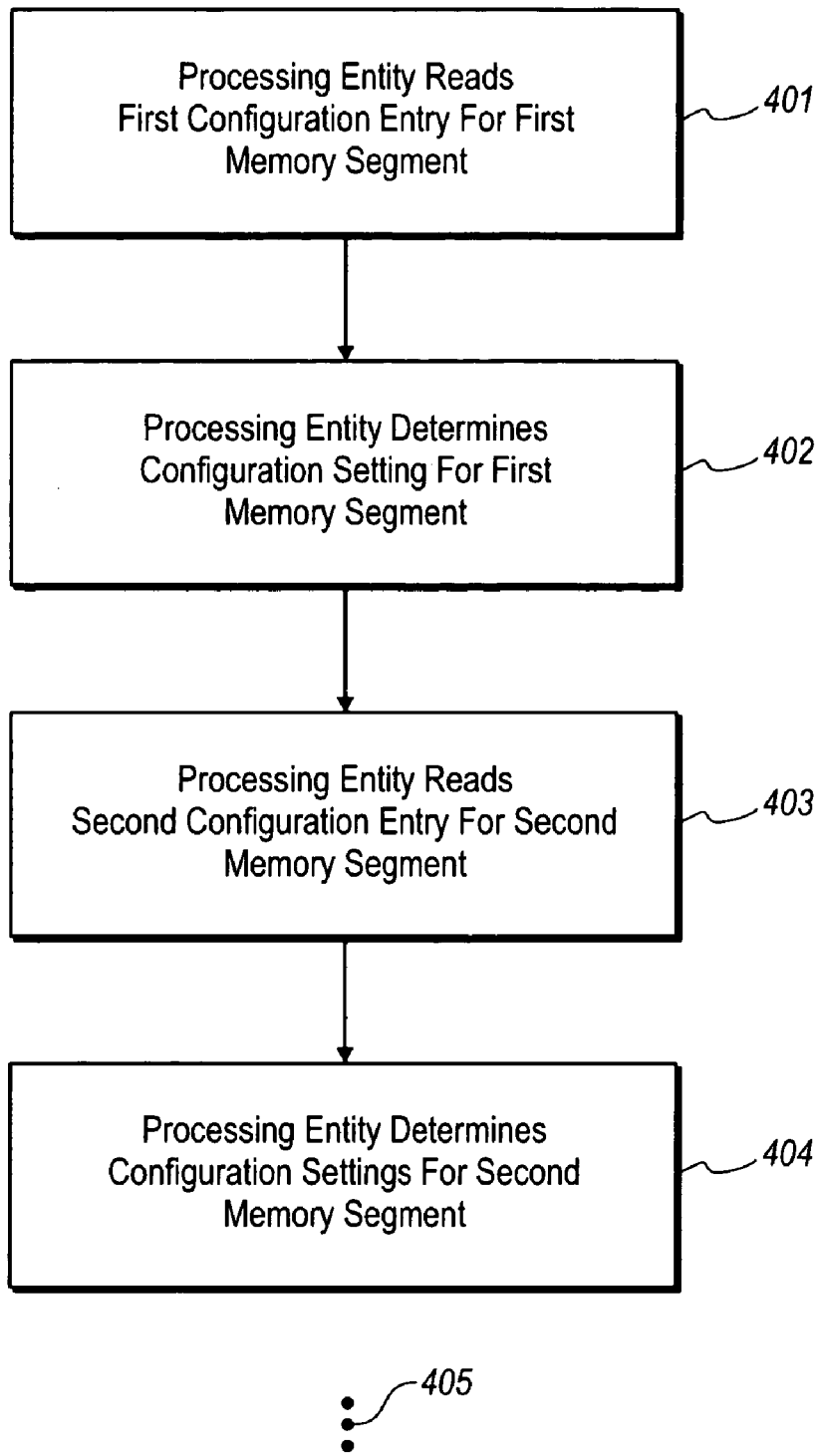
FIG. 4 illustrates a method for configuring memory on a per-segment basis in accordance with the principles of the present invention.

Referring to FIG. 4, a flowchart of a method 400 for an optical transceiver to configure the system memory on a per-segment basis is depicted. First, a processing entity reads a first configuration entry in a memory configuration table corresponding to a first memory segment of controller system memory 206 (act 401). In the claims and in the written description, "processing entity" is defined to mean a microprocessor such as a processor 203, a state machine, or any other processing device capable of reading a configuration table. As mentioned previously, the configuration entry defines a set of one or more configuration settings such as read and write for the memory segment. Consequently, the use of terms "first", "second" and so forth to modify a configuration entry or a memory segment is not intended to represent any sequential, temporal or spatial ordering of the configuration entries or memory segments, but is used merely to distinguish one configuration entry or memory segment from another.

The processing entity then determines configuration settings for the first memory segment based on the configuration entry read (act 402). For example, the processing entity may read in the memory configuration entry that the memory segment is readable without a password and corresponds to a processor interrupt should a write occur. The processing entity uses the reading to configure the system to cause a processor interrupt to be generated to the identified processor should a write to the memory segment occur. Should a request to read the memory segment be received, these configuration settings may be used to determine that the reading should be allowed without any password requirements.

This process may be performed for other memory segments as well. For example, the processing entity then may read a second configuration entry in the memory configuration table corresponding to a second segment of controller system memory 206 (act 403). The configuration entry defines a set of configuration settings for the second memory segment that may be different from the set of configuration settings for the first segment of memory.

Finally, the processing entity determines configuration settings for the second memory segment based on the second configuration entry read (act 404). For example, the processing entity may read in the memory configuration entry a configuration setting for writeable memory. The processing entity uses the reading to configure the memory segment to be writable. Although only described for two memory segments, the method may also be performed on as many segments of system memory (as represented by the vertical ellipses 405) for which there is a corresponding memory configuration entry in the memory configuration table.

Having described a general method for configuring the system memory on a per-segment basis, specific embodiments will now be described with greater detail. Some embodiments, as mentioned, implement a memory configuration table that comprises multiple tables. These multiple tables may be implemented as a plurality of hierarchical tables. The plurality of hierarchical tables includes one or more lower-level tables. A main table includes indexes that index into the lower-level tables. The lower-level tables may have indexes that index into additional lower-level tables. The lower-level tables have increasing granularity in that each configuration entry corresponds to a smaller and smaller amount of system memory. In this way, it is possible to configure each segment of system memory on a byte-by-byte basis (or even perhaps a bit-by-bit basis) if necessary.

Figure 5A:
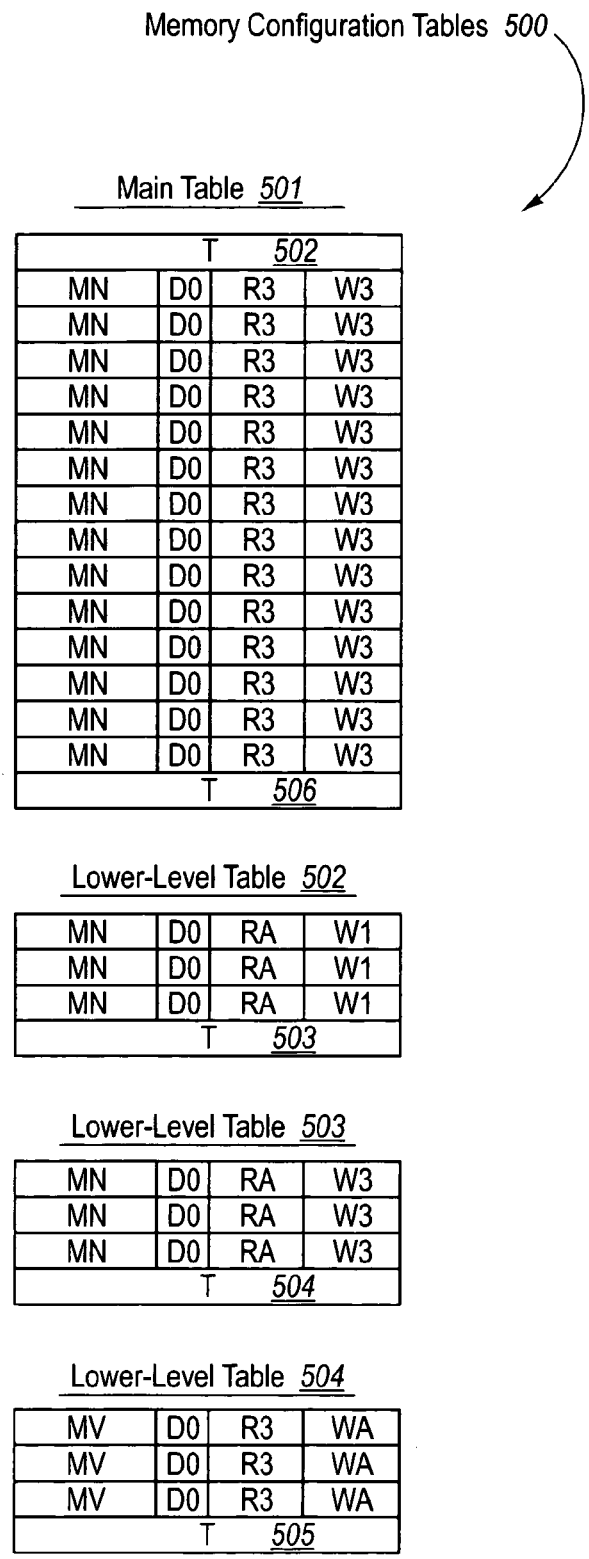
FIG. 5 illustrates a block diagram of a set of hierarchal memory configuration tables including indexes in accordance with embodiments of the present invention.

Referring to FIG. 5 (represented as FIGS. 5A and 5B due to the size of the hierarchical tables), an example set of hierarchical tables 500 is shown by way of illustration only and should not be read to limit any claims. A main table 501 covers the entire system memory, or at least the entire portion that is configurable. In this example, the configurable, memory is approximately 2K bytes. The memory configuration abbreviations 320 of FIG. 3 are used in the figures to depict the configuration settings.

In main table 501, there are sixteen entries shown, each covering a memory segment of 128 bytes. All entries but the first and sixteenth entries have configuration settings shown that indicate that the memory segments are non-volatile memory (i.e., "MN"), cover device one (i.e., "D0"), and are both readable and writeable using password 3 (i.e., "R3" and "W3"). These main entries require relatively little configuration information since four bytes of configuration information may be used to define configuration for the 128 byte segments. Of course, the size of the segments may be much larger including entire kilobytes, megabytes, or gigabytes, or so forth. However, the first and sixteenth entries contain an index that indexes into lower-level tables having more refined granularity. In this case, the first entry of main table 501 into lower-level table 502 while the sixteenth entry of the main table indexes into lower level table 506.

Lower-level table 502 has four entries that define configuration for memory segments that are 32 bytes in size. In this case, the configuration settings indicate that the memory segments are non-volatile memory, cover device one, and are both readable by all (i.e., "RA") and writeable by password 1 (i.e., "W1"). However, the fourth entry contains an index to an even lower-level table 503 having even more refined granularity.

For instance, lower-level table 503 has four entries that define configuration for memory segments that are only eight bytes in size. In this case, the configuration settings indicate that the memory segments are non-volatile memory, cover device one, and are both readable by all and writeable by password 3. However, the fourth entry contains an index to a lower-level table 504 having more refined granularity.

Lower-level table 504 has four entries that define configuration for memory segments that are only two bytes in size. These entries also require relatively high configuration information since four bytes of configuration information may be used to define configuration for the two byte segments. In this case the configuration settings indicate memory segments that are volatile memory, cover device one, are readable by password 3, and are writeable by all (i.e., "WA"). However, the fourth entry contains an index to a lowest-level table 505 having very refined granularity of just one byte.

Lowest-level table 505 has two entries that define configuration for memory segments that are a mere one byte in size. These entries require the highest level of configuration information since four bytes of configuration information is used to define configuration for the one byte segments. The first entry has configuration settings indicating a memory segment that produces a processor interrupt whenever the memory segment is written to or read (i.e., "MA0"), is readable by password 3, and is writable by all. The second entry has configuration settings indicating a memory segment that produces a processor interrupt whenever the memory segment is written to or read (i.e., "MA1"), is readable by all, and is writable by password 1.

In like manner, lower-level table 506 has four entries that cover segments of memory that are 32 bytes. The first three entries contain configuration settings that indicate the configurations for the entire 32 bytes of memory. In this case the configuration settings indicate memory segments that are non-volatile memory, cover device two (i.e., "D1"), are readable by all, and are writeable by password 3. However, the fourth entry contains an index to a lower-level table 507 having more refined granularity.

Lowest-level 507 has four entries that cover segments of memory that are eight bytes. The entries contain configuration settings that indicate the configurations for the entire eight bytes of memory. In this case the configuration settings indicate memory segments that are non-volatile memory, cover device two, and are both readable by all and writeable by password 1. However, there are no indexes to a lower table.

The hierarchal table just described is only one of countless ways that a hierarchal table system may be implemented. One of skill in the art will appreciate the versatility that this type of system provides in determining the size and number of the individual tables, the size of the memory segments covered by individual configuration entries and so on. The hierarchal tables allow the configuration of the system memory on a per-segment basis down to a single byte if desired, or even further.

In some embodiments, as mentioned above, a segment of memory may be configured by optical transceiver 100 to be non-volatile memory. In such embodiments, the optical transceiver 100, after determining that the segment is non-volatile, may direct that any data written to the memory segment be written back to a persistent memory source such as persistent memory 106. In this way, the data that is written may be stored in both volatile (such as controller system memory 206) and non-volatile memory. For example, the memory configuration table may contain a configuration entry with configuration settings that indicate that a particular segment of memory is non-volatile and writable. A processing entity would read the configuration entry and the corresponding configuration settings as described. The processing entity would then configure the memory segment to be non-volatile memory and writable. When data was written to the memory segment, either by a host computing system or processor 203, then the written data would be written to persistent memory 106.

In other embodiments, as mentioned previously, a segment of memory may be configured by optical transceiver 100 to produce a processor interrupt. The processor interrupt may be generated for a segment of memory that is configured to produce an interrupt when a portion of the segment has been overwritten in an undesired manner. The processor interrupt may also be generated when a segment of memory has been read by an unauthorized party. The processor, in such cases, may stop all other activities and proceed to restore the memory segment to it original value by writing new data to the memory segment or by initiating a warm reboot. The interrupts may be an important safeguard for memory segments containing sensitive data. In embodiments that implement two processors, such as the embodiment of FIG. 2 (i.e., processor 203A and 203B), both processors may be independently configured to enable either of the interrupts or both of the interrupts. For example, processor 203A may be configured to enable only MA0, only MA1, or both MA0 and MA1. Processor 203B may be enabled in like manner.

Accordingly, the principles of the present invention relate to configuring memory on a per-segment basis. A memory configuration table is utilized, allowing the configuration of large portions of memory while only using a very small amount of memory for the table. In addition, different size memory segments may be configured for different purposes. These segments may later be reconfigured by changing configuration settings contained in the configuration table. The memory segments may be configured on a byte level if necessary. This leads to an efficient use of limited memory resources. Accordingly, the principles of the present invention are a significant advancement in the art of configuring memory in optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring a system memory of an optical transceiver, the method comprising:
   an act of a processing entity in the optical transceiver reading a first configuration entry from a memory configuration table, the first configuration entry defining a set of configuration settings for a first memory segment in the system memory of the optical transceiver, the set of configuration settings for the first memory segment defining whether or not a write to the first memory segment should trigger a processor interrupt, where the memory configuration table includes:
   a first configuration table, the first configuration table including:
      a plurality of configuration entries, each of which defines configuration settings for a respective memory segment of a first set of memory segments; and
   a second configuration table including:
      a plurality of configuration entries, each of which defines configuration settings for a respective memory segment of a second set of memory segments,
   wherein the first configuration table includes an index that indexes into the second configuration table;
   an act of the processing entity determining configuration settings for the first memory segment based on the first configuration entry read;
   an act of the processing entity configuring the first memory segment based upon the determined configuration settings, wherein a memory segment in the second set of memory segments is smaller than the first memory segment;

an act of determining that an original value of the first memory segment has been overwritten by a new value;

an act of triggering the processor interrupt based on the set of configuration settings for the first memory segment; and an act of restoring the first memory segment to the original value.

2. A method in accordance with claim 1, wherein a set of configuration settings for a memory segment in the system memory of the optical transceiver defines whether or not the memory segment in the system memory of the optical transceiver is writeable.

3. A method in accordance with claim 1, wherein a set of configuration settings for a memory segment in the system memory of the optical transceiver defines whether or not the memory segment in the system memory of the optical transceiver is readable.

4. A method in accordance with claim 1, wherein a set of configuration settings for a memory segment in the system memory of the optical transceiver defines whether or not the memory segment in the system memory of the optical transceiver is non-volatile memory.

5. A method in accordance with claim 1, wherein a set of configuration settings for a memory segment in the system memory of the optical transceiver defines whether or not the memory segment in the system memory of the optical transceiver is volatile memory.

6. A method in accordance with claim 1, wherein a third memory segment is smaller than the memory segment in the second set of memory segments, and the third memory segment has a configuration that is defined by a configuration entry in a third configuration table.

7. A method in accordance with claim 6, wherein a fourth memory segment is smaller than the third memory segment, and the fourth memory segment has a configuration that is defined by a configuration entry in a fourth configuration table.

8. A method in accordance with claim 1, wherein the processing entity is a state machine.

9. A method in accordance with claim 1, wherein the processing entity is a processor.

10. A method in accordance with claim 1, wherein the memory configuration table contains configuration settings for at least two separate devices.

11. A method in accordance with claim 1, wherein a memory segment in the second set of memory segments is a power of two times smaller than the first memory segment.

12. An optical transceiver comprising:
a processing entity;
a system memory;
a memory configuration table having a plurality of configuration tables that includes at least first and second configuration tables, wherein:
the first configuration table includes a plurality of configuration entries, each of which defines one or more configuration settings for a respective memory segment of a first set of memory segments; and
the second configuration table includes a plurality of configuration entries, each of which defines one or more configuration settings for a respective memory segment of a second set of memory segments, the memory segments of the second set having a size that is different than a size of the memory segments in the first set;

wherein the processing entity is programmed to configure the system memory on a per-segment basis by performing the following:
reading a first configuration entry defining a first set of one or more configuration settings for a first memory segment in the system memory of the optical transceiver, wherein the set of configuration settings for the first memory segment defines whether or not a write to the first memory segment should trigger a processor interrupt;
determining configuration settings for the first memory segment based on the first configuration entry read;
configuring the first memory segment based upon the configuration settings that were determined for the first memory segment;
determining that an original value of the first memory segment has been overwritten by a new value;
triggering the processor interrupt based on the set of configuration settings for the first memory segment; and
restoring the first memory segment to the original value.

13. An optical transceiver in accordance with claim 12, wherein one or more of the plurality of configuration tables include indexes indexing into one or more other configuration tables.

14. An optical transceiver in accordance with claim 12, wherein the processing entity is one of a state machine or a processor.

15. An optical transceiver in accordance with claim 12, wherein the first configuration table provides a configuration information for all configurable portions of the optical transceiver system memory.

16. An optical transceiver in accordance with claim 12, wherein a hierarchical configuration table of the plurality of hierarchical configuration tables defines configuration information for one or more memory segments whose size is one byte.

17. An optical transceiver in accordance with claim 12, wherein the first configuration table includes one entry that indexes into a third configuration table, and the first hierarchical configuration table includes another entry that indexes into a fourth configuration table.

18. An optical transceiver in accordance with claim 12, wherein the memory segments in the first set of memory segments are larger in size than the memory segments in the second set of memory segments.

19. An optical transceiver in accordance with claim 12, wherein the processing entity is programmed to configure the system memory on a per-segment basis by further performing the following:
reading a second configuration entry defining a second set of one or more configuration settings for a second memory segment in the system memory of the optical transceiver;
determining configuration settings for the second memory segment based on the second configuration entry read; and
configuring the second memory segment based upon the configuration settings that were determined for the second memory segment.

20. A method in accordance with claim 1, further comprising:
 an act of reading a second configuration entry defining a second set of one or more configuration settings for a second memory segment in the system memory of the optical transceiver;
 an act of determining configuration settings for the second memory segment based on the second configuration entry read; and
 an act of configuring the second memory segment based upon the configuration settings that were determined for the second memory segment.

* * * * *